United States Patent Office 2,810,778
Patented Oct. 22, 1957

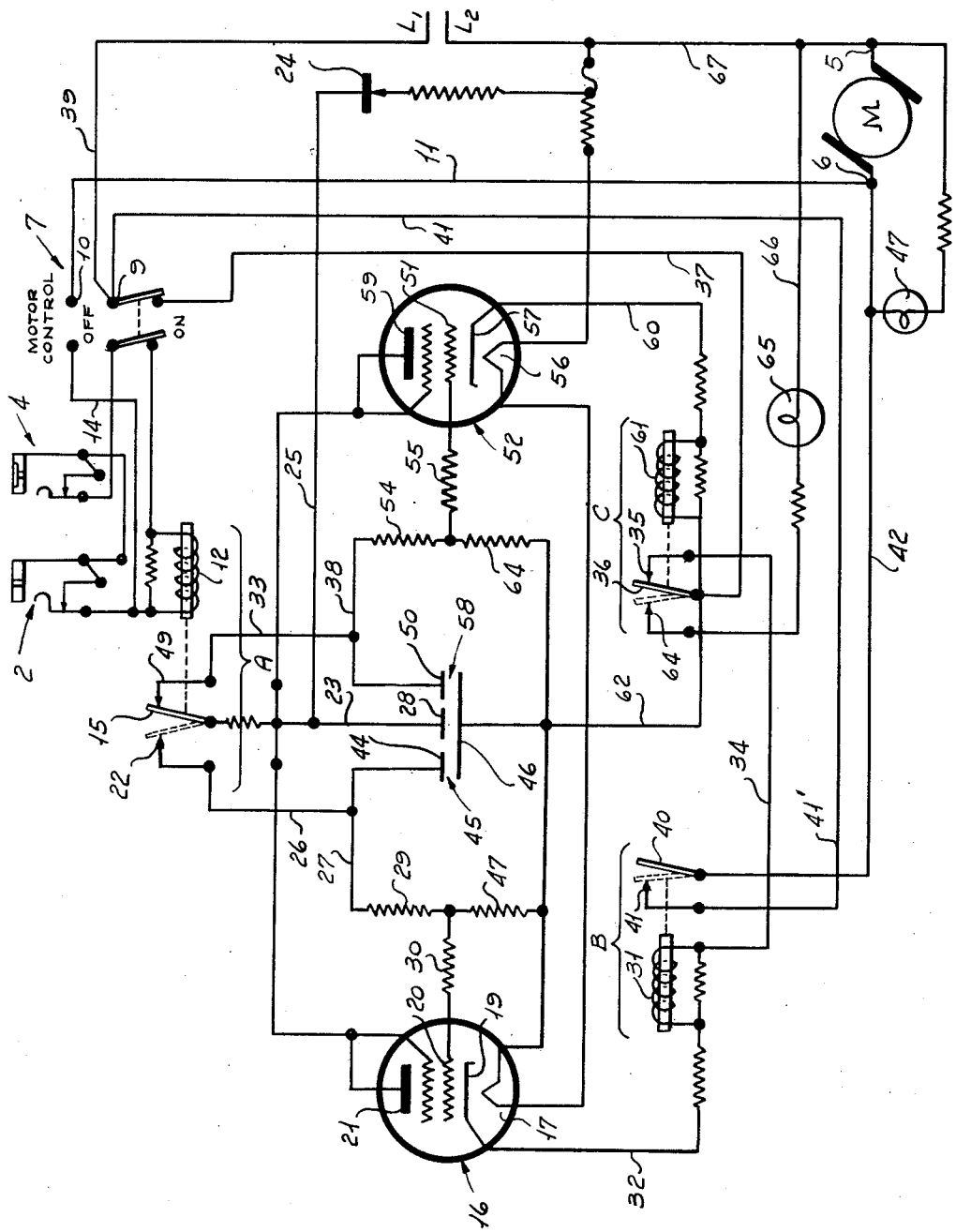

2,810,778

MOTOR CONTROL DEVICE

William A. Manty, Waldwick, N. J., and George D. Poole, Lakewood, Ohio, assignors to Nestor Engineering Company, East Rutherford, N. J., a corporation of New Jersey Application February 12, 1954, Serial No. 410,018

6 Claims. (Cl. 178—4.1)

This invention relates to motor control devices, and more particularly to telegraphic communication systems and to motor control arrangements for use in such systems.

The present invention is concerned with an arrangement whereby a motor at a telegraphic station is automatically controlled in response to signal line conditions. In accordance with the invention the motor is (1) automatically started upon the reception at the station of a spacing signal from the signal line, which is normally marking. The preferred arrangement of the invention is such that the motor is (2) automatically stopped a predetermined time after the reception of the last message signal and the signal line has resumed its normal marking condition, and (3) the motor is automatically stopped a predetermined time after the signal line voltage has failed, that is, when the signal line is in a steady spacing condition. In addition, the control device of the invention is such that (4) it stops the motor upon any internal failure in the device which causes movement of the signal responsive relay into either its marking or its spacing position for a predetermined length of time.

The communication system includes a signal line, a telegraph receiver including an operating motor, a source of power for the motor, and a control device responsive to signal line conditions for controlling the motor. The embodiment of the control device disclosed includes a pair of electronic tubes, a first relay means responsive to marking and spacing impulses on the signal line, a second relay controlling the motor, and a third relay controlling the second relay. Individual capacitor means are provided for each tube, there being charging circuits for each capacitor means controlled by the first relay. The first relay means acts during normal reception of a marking signal to charge the capacitor means for the first tube to render the tube conductive and during reception of a prolonged spacing signal to discharge such capacitor means to render the first tube non-conductive. The first relay means also acts during normal reception of a spacing signal to charge the capacitor means for the second tube to render such second tube conductive and during prolonged reception of a marking signal to discharge such capacitor to render the second tube non-conductive. The first tube is connected to energize the third relay when the first tube is conductive and the second tube is connected to energize the second relay when the first tube is conductive.

The described system and its motor control device function to start the motor upon the initial reception of a spacing signal. The motor continues to operate during the reception of a message, but is stopped a predetermined time after the cessation of reception of a message at the station and/or a predetermined time after the beginning of a prolonged failure of signal line voltage.

It is among the objects of the invention to provide a novel motor control arrangement which controls the motor to start and stop it in response to different signal line conditions.

A further object of the invention resides in the provision of a motor control device, and a telegraphic system incorporating such device, wherein the motor control is operative to start a motor and to stop such motor, as required, a predetermined length of time after predetermined line conditions have been established.

The above and further objects of the invention will become apparent in the following description of a preferred embodiment of the motor control device and telegraphic communication system of the invention.

Our invention is clearly defined in the appended claims. In the claims, as well as in the description, parts are at times identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawing forming part of this specification, in which:

The single figure is an electrical circuit diagram of the motor and printer controlling portion of a subscriber telegraphic printer station, including the motor control device of the present invention.

In most telegraphic communication systems of the type with which the present invention is concerned the signal line has a steady D. C. voltage, that is, it transmits a "marking" signal when no message is being transmitted. The transmission of a message is preceded by a "spacing" signal, that is, a momentary cessation of the steady marking signal. As above indicated, the present invention provides a control for the printer motor of a telegraphic station wherein the motor is started upon the reception of the first spacing signal, and is stopped a predetermined time after the steady normal marking signal has begun. The motor also is stopped a predetermined length of time after the reception of a prolonged spacing signal, caused for example by an open signal line, has begun.

The printer motor M, shown as being plugged into the outlets 5 and 6 of the control device, is supplied with current from the source $L_1$, $L_2$ directly through the manually operated switch 7 when the switch is in its upper or "motor control off" position. When switch 7 is in such position, the equipment is under manual control and outlet 5 is fed from $L_2$ through wire 67 and outlet 6 is fed from $L_1$ through contacts 9 and 10 of switch 7, and through wire 11. The current supplied by $L_1$, $L_2$ may be either alternating or direct, assuming motor M is a universal motor. When switch 7 is in its "off" position the signal line and the printer control are connected through wire 14 which shorts out the printer control.

When switch 7 is in its lower or "motor control on" position the motor M is started and stopped by the control device of the invention which, in turn, is under the control of voltage conditions in the signal line. Such signal line (not shown) is plugged into the control device at the jack 2. When the signal line is thus plugged in it is in series with the coil 12 of line signal responsive relay A and with the coil of the printer control (not shown) which is plugged into the device at the jack 4.

Relay A is of such design that when de-energized its solenoid moves to the left and that under steady marking signal conditions the coil 12 of the relay solenoid is energized and the movable contact 15 of the relay is in the right, full line, position. Under such marking condition the movable contacts of relays B and C, to be described, are also in their right-hand, full line, positions. Upon the reception at relay A of the spacing signal at the beginning of a message, coil 12 is de-energized and the solenoid and movable contact 15 move to the left position, closing contacts 15, 22 and thus energizing the capacitor charging circuit for the left-hand electronic tube 16.

Such tube, which is a beam type amplifier, has a filament 17 supplied by an obvious circuit, a cathode 19, a main grid 20, and a plate 21. The tube 16 is conductive when grid 20 has a predetermined positive potential and is non-conductive when the potential of the grid falls below such value. The circuit from the rectifier 24 through wire 25 to movable contact 15 of relay A, left-hand fixed contact 22, and wire 26 to plate 44 of condenser 45 constitutes a part of the charging circuit for the grid-biasing condenser, made up of plates 44 and 46, for tube 16. The remainder of such charging circuit is made up of wire 39 from $L_1$, switch 7, wire 37, and wire 62 to plate 46.

Grid 20 of tube 16 is connected by resistor 30 between series resistors 29 and 47 which bridge, and are in shunt with, the condenser plates 44 and 46. When the condenser 45 formed by plates 44 and 46 is charged by the closing of contacts 15, 22 the grid 20 has a positive charge and tube 16 is conductive. The tube then energizes the coil 31 of motor control relay B (assuming movable contact 36 of relay C is in its right-hand, full line, position) through wire 32 to one end of coil 31 and through wire 34 to the other end of the coil, contacts 35, 36 of relay C, wire 37 to switch 7, and wire 39 to $L_1$.

When energized, relay B moves its contact 40 to the left-hand, dotted line, position engaging contact 41, thereby supplying motor outlet 6 with current from $L_1$ through wire 39, switch 7, wire 41', contacts 40, 41, and wire 42. The printer motor M now starts.

During the transmission of a message, which consists of a series of marking (on) and spacing (off) pulses, the relay A will repeatedly move contact 15 from its right- to its left-hand position. Each time contacts 15 and 22 are in engagement they again restore the charge on condenser plates 44, 46 to its full value. Thus during the normal transmission of a message the tube 16 remains conductive, contacts 40, 41 of relay B remain closed, and printer motor M remains running. Every time contacts 15, 22 are broken, however, the charge between plates 44, 46 begins to decay by discharge through resistors 29 and 47. The values of such resistors taken with the capacity of condenser 44, 46 are such that if the condenser is not again charged for a predetermined period the charge will have decayed to such an extent that the bias on grid 20 decreased sufficiently to render tube 16 non-conductive. A period of approximately one minute has been found satisfactory for such predetermined time delay period. When this occurs, relay B is de-energized, contacts 40, 41 open, and motor M stops. Therefore the portion of the control device thus far described functions to start the motor M, and under steady marking signal line conditions to stop it a predetermined time after the cessation of the transmission of a message.

The device also functions, as indicated, to stop the motor upon the existence in the signal line of a steady spacing or open line condition for a predetermined length of time. When the movable contact 15 of relay A is in its marking or right-hand position it completes a charging circuit for a capacitor means for a second electronic tube 52. Such tube, which is similar to tube 16, likewise has a filament 56 connected in series with filament 17 of tube 16, a cathode 57, a main grid 51, and a plate 59. The potential of grid 51 is applied thereto by a condenser 58 having plates 50, 46 acting through the series bridging resistors 54, 64, which are in shunt with the condenser 58. The resistor 55 connects grid 51 between intermediate resistors 54, 64. Condenser plates 44, 50, 46, and central upper plate 28, connected to current source 25 and to contact 15 of relay A by wire 23, are contained in one envelope.

When the charge on grid 51 exceeds a predetermined positive value, tube 52 becomes conducting, and when such charge falls below the predetermined value the tube becomes non-conducting. The condenser 50, 46 is recharged every time contacts 15, 49 of relay A engage each other through wire 25 from rectifier 24, contacts 15, 49, and wires 33 and 38 to plate 50, the bottom condenser plate 46 being connected to $L_1$ as above explained in connection with the operation of tube 16.

The tube 52 is thus conductive when, under operating conditions, contacts 15, 49 steadily engage each other, as under marking signal line conditions, or intermittently contact each other, as under normal line conditions during the transmission of a message. Tube 52 under such conditions energizes the coil 61 of relay C, the relay when energized maintaining the movable contact 36 in the right-hand, full line, position. Such energization of coil 61 is through wire 60 from the cathode 59 of tube 52 to one end of the coil, and through wire 37 from the other end of the coil, through switch 7, to wire 39 and thus to source $L_1$.

As above indicated, the contacts 35, 36 of relay C are in series with the source of supply of energizing current for the coil 31 of relay B. When relay C opens contacts 35, 36, therefore, relay B is de-energized, contacts 40, 41 thereof are opened, and motor M is stopped. The part of the circuit including tube 52, the capacitor means 46, 50 therefore, and the charging and discharging circuit for the capacitor is designed to hold relay C with contacts 35, 36 closed for a predetermined length of time after the termination of a marking signal and to open such contacts thereafter to stop the motor. A period of approximately 20 seconds after cessation of the marking signal has been found satisfactory for such time delay.

The condenser 46, 50 begins to lose its charge by leakage through resistors 54, 65 the moment the capacitor charging contacts 15, 49 open. If contact 15 remains in its left-hand, spacing position long enough, the bias on grid 51 falls to such value that tube 52 becomes non-conductive, relays C and B are sequentially de-energized, and motor M stops.

The motor control device of the invention thus starts the motor in response to a spacing signal on the line following a steady marking signal, and stops the motor in response to a prolonged marking signal and also in response to a prolonged spacing signal. It will be obvious that the control device will also function to stop the motor upon failure of one or more parts internal of the control device such as would, independent of the line signal, cause the movable contact 15 of relay A to remain in either its spacing or marking position for abnormal lengths of time.

For ease in observing the operation of the control device, a signal lamp 47 is connected parallel to motor M, as shown. Lamp 47 is lighted when the motor M is running or, if the motor is disconnected, when outlets 5 and 6 are energized. A second signal lamp 65 is connected to $L_2$ through wire 66. The lamp is also connected to the left-hand fixed contact 64 of relay C, which is connected to $L_1$ through contacts 36, 64, wire 37, switch 7, and wire 39. When relay C is de-energized and contacts 36, 64 are in engagement, lamp 65 is lighted. Lamp 65 thus indicates, if all other components are operative, an open-line or continuous spacing signal condition in the signal line.

Whereas for purposes of illustration we have shown and described a preferred embodiment of the telegraphic communication system and the motor control arrangement of the invention, it will be understood that such embodiment is illustrative only and that the scope of the invention is defined by the claims appended hereto.

We claim as new the following:

1. In a telegraph system, a signal line, a telegraph receiver including an operating motor, a source of power for the motor, a pair of electronic tubes, a first relay responsive to marking and spacing impulses on said line, a second relay controlling the motor, and a third relay controlling the second relay, individual capacitor means for each tube, charging circuits for said capacitor means selectively energized and de-energized by said first relay means, said first relay means acting during normal reception of a marking signal to charge the capacitor means for the first tube to render the tube conductive, shunt means in circuit with the first capacitor means operative during reception of a prolonged spacing signal to discharge such capacitor means to render the first tube non-conductive, said first relay means also acting during normal reception of a spacing signal to charge the capacitor means for the second tube to render the second tube conductive, shunt means in circuit with the second capacitor means operative during prolonged reception of a marking signal to discharge such capacitor to render the second tube non-conductive, the first tube being connected to energize the third relay when the first tube is conductive, the second tube being connected to energize the second relay when the second tube is conductive, whereby the motor is started upon reception of a spacing signal, continues to operate during the reception of a message consisting of intermittent marking and spacing impulses, is stopped a predetermined time after the cessation of reception of a message, and is stopped a predetermined time after the beginning of a prolonged failure of signal line voltage.

2. In a telegraph system, a signal line, a telegraph receiver including an operating motor, an electronic tube, a first relay having marking and spacing contacts, said first relay being responsive to marking and spacing impulses on said line, a second relay controlling the motor, said second relay having a winding and a third relay, said third relay having a winding and having contacts in series with the winding for the second relay, said contacts being closed when the winding of the third relay is energized, a capacitor means for the tube, a charging circuit for said capacitor means directly connected to the marking contacts of said first relay means, said first relay means acting during normal reception of a marking signal to charge the capacitor means for the tube to render the tube conductive, shunt means in circuit with the capacitor means operative during prolonged reception of a spacing signal to discharge such capacitor to render the tube non-conductive, the tube being connected to energize the third relay when the tube is conductive, and means responsive to the first relay to energize the second relay upon the reception of a spacing signal, whereby the motor is started upon reception of a spacing signal at the beginning of a message, continues to operate during the reception of a message consisting of intermittent marking and spacing impulses, and is stopped a predetermined time after the beginning of a prolonged failure of signal line voltage.

3. A control device adapted for use in a telegraph system having a telegraph receiver, a signal line connected to the telegraph receiver, and an operating motor for the receiver, said control device comprising a first relay responsive to line impulses and having a contactor movable to marking and spacing positions in response to marking and spacing impulses on said line, respectively, a second relay provided with a winding and having contacts for selectively starting and stopping said motor, an energizing circuit for the winding of the second relay, and a third relay provided with a winding and having contacts in series with the energizing circuit for the second relay, a first and second electronic tube, said capacitors when charged to a predetermined first potential acting to render the respective tube conductive, such tubes being non-conductive when their respective capacitors are discharged to a predetermined second, lower potential, a first and second capacitor connected of the respective tube, a first and second charging circuit for the first and second capacitors, respectively, the first relay having marking contacts which are closed in the marking position of its contactor and are open in the spacing position thereof, the first relay further having spacing contacts which are closed in the spacing position of its contactor and are open in the marking position thereof, said marking contacts being in series with the charging circuit for the first capacitor and said spacing contacts being in series with the charging circuit for the second capacitor whereby the first relay acts during reception of a marking signal to charge the first capacitor to render the first tube conductive and acts during reception of a spacing signal to charge the second capacitor to render the second tube conductive, a first and second resistance connected in shunt with the first and second capacitors, respectively, the first resistance being operative to discharge the first capacitor so that during the reception of a prolonged spacing signal the first capacitor is discharged sufficiently after a predetermined time to render the first tube non-conductive, the first tube being connected to energize the winding of the third relay when the first tube is conductive, the second resistance being operative to discharge the second capacitor so that during the reception of a prolonged marking signal the second capacitor is discharged sufficiently after a predetermined time to render the second tube non-conductive, the second tube being connected to energize the winding of the second relay when the second tube is conductive, whereby the motor is started upon reception of a spacing signal, continues to operate during the reception of a message consisting of intermittent marking and spacing impulses, is stopped a predetermined time after the cessation of reception of a message, and is stopped a predetermined time after the beginning of a prolonged failure of signal line voltage.

4. A control device adapted for use in a telegraph system having a telegraph receiver, a signal line connected to the telegraph receiver, and an operating motor for the receiver, said control device comprising a first relay responsive to line impulses and having a contactor movable to marking and spacing positions in response to marking and spacing impulses on said line, respectively, a second relay provided with a winding and having contacts for selectively starting and stopping said motor, an energizing circuit for the winding of the second relay, and a third relay provided with a winding and having contacts in series with the energizing circuit for the second relay, said contacts of the third relay being closed when the winding of the third relay is energized, a first and second electronic tube each having a grid and a cathode, each tube being conductive when its grid has a predetermined positive value of potential relative to that of the cathode and non-conducting when the potential of the grid falls below such value, a first and second capacitor connected to the grid of the respective tube, a first and second charging circuit for the first and second capacitors, respectively, the first relay having marking contacts which are closed in the marking position of its contactor and are open in the spacing position thereof, the first relay further having spacing contacts which are closed in the spacing position of its contactor and are open in the marking position thereof, said marking contacts being in series with the charging circuit for the first capacitor and said spacing contacts being in series with the charging circuit for the second capacitor whereby the first relay acts during reception of a marking signal to charge the first capacitor to render the first tube conductive and acts during reception of a spacing signal to charge the second capacitor to render the second tube conductive, a first and second resistance connected in shunt with the first and second capacitors, respectively, the first resistance being operative to discharge the first capacitor so that during the reception of a prolonged spacing signal the first capacitor is discharged sufficiently after a predetermined time to render the first tube non-conductive, the first tube being connected to energize the winding of the third relay when the first tube is conductive, the second resistance being operative to discharge the second capacitor so that during the reception of a prolonged marking signal the second capacitor is discharged sufficiently after a predetermined time to render the second tube non-conductive, the second tube being connected to energize the winding of the second relay when the second tube is conductive, whereby the motor is started upon reception of a spacing signal, continues to operate during the reception of a message consisting of intermittent marking and spacing impulses, is stopped a predetermined time after the cessation of reception of a message, and is stopped a predetermined time after the beginning of a prolonged failure of signal line voltage.

5. A control device adapted for use in a telegraph system having a telegraph receiver, a signal line connected to the telegraph receiver, and an operating motor for the receiver, said control device comprising: a first relay responsive to line impulses and having a contactor movable to marking and spacing positions in response to marking and spacing impulses on said line respectively, a second relay provided with a winding and having contacts for selectively starting and stopping said motor, an energizing circuit for the winding of the second relay, a third relay provided with a winding and having contacts in series with the energizing circuit for the second relay, an electronic tube, said capacitor when charged to a predetermined, first potential acting to render the tube conductive, the tube being non-conductive when the capacitor is discharge to a predetermined second lower potential, a capacitor connected to the tube, a charging circuit for said capacitor, the first relay having marking contacts which are closed in the marking position of its contactor, said marking contacts being in series with the energizing circuit for the capacitor whereby the first relay acts during reception of a marking signal to charge the capacitor to render the tube conductive, a resistance connected in shunt with the capacitor and operative to discharge the capacitor so that during the reception of a prolonged spacing signal and the consequent opening of the marking contacts of the first relay the capacitor is discharged sufficiently after a predetermined time to render the tube non-conductive, the tube being connected to energize the winding of the third relay when the tube is conductive, and means responsive to the first relay to energize the winding of the second relay upon the reception of one or more spacing signals in a predetermined time interval, whereby the motor is started upon reception of a spacing signal at the beginning of a message, continues to operate during the reception of a message consisting of intermittent marking and spacing impulses, and is stopped a predetermined time after the beginning of a prolonged failure of signal line voltage.

6. A control device adapted for use in a telegraph system having a telegraph receiver, a signal line connected to the telegraph receiver, and an operating motor for the receiver, said control device comprising: a first relay responsive to line impulses and having a contactor movable to marking and spacing positions in response to marking and spacing impulses on said line, respectively, a second relay provided with a winding and having contacts for selectively starting and stopping said motor, an energizing circuit for the winding of the second relay, a third relay provided with a winding and having contacts in series with the energizing circuit for the second relay, said contacts of the third relay being closed when the winding of the third relay is energized, an electronic tube having a grid and a cathode, said tube being conductive when the grid has a predetermined positive value of potential relative to that of the cathode and non-conductive when the potential of the grid falls below such value, a capacitor connected to the grid of the tube, a charging circuit for said capacitor, the first relay having marking contacts which are closed in the marking position of its contactor, said marking contacts being in series with the energizing circuit for the capacitor whereby the first relay acts during reception of a marking signal to charge the capacitor to render the tube conductive, a resistance connected in shunt with the capacitor and operative to discharge the capacitor so that during the reception of a prolonged spacing signal and the consequent opening of the marking contacts of the first relay the capacitor is dicharged sufficiently after a predetermined time to render the tube non-conductive, the tube being connected to energize the winding of the third relay when the tube is conductive, and means responsive to the first relay to energize the winding of the second relay upon the reception of one or more spacing signals in a predetermined time interval, whereby the motor is started upon reception of a spacing signal at the beginning of a message, continues to operate during the reception of a message consisting of intermittent marking and spacing impulses, and is stopped a predetermined time after the beginning of a prolonged failure of signal line voltage.

References Cited in the file of this patent
UNITED STATES PATENTS

| | | |
|---|---|---|
| 2,217,572 | Bernstein | Sept. 10, 1940 |
| 2,538,994 | Wampach | Jan. 23, 1951 |